Patented Dec. 24, 1940

2,225,893

UNITED STATES PATENT OFFICE 2,225,893

PRODUCTION OF SECONDARY ALIPHATIC NITRATES

Byron M. Vanderbilt, Roselle Park, N. J., assignor to Standard Oil Development Company, a corporation of Delaware No Drawing. Application March 30, 1939, Serial No. 264,979

11 Claims. (Cl. 260—467)

This invention relates to the manufacture of aliphatic nitrates and more particularly to a method for obtaining secondary alkyl nitrates in high yields by the nitration of aliphatic compounds containing a secondary alcoholic group.

Little information has been published regarding the preparation of secondary alkyl nitrates. These compounds are notably difficult to form, on account of the violence of the reaction of nitric acid with aliphatic alcohols at ordinary temperatures, and on account of the tendency of the acid to form oxidation products and oxides of nitrogen when reacting with the secondary alcoholic group. The oxides of nitrogen are known to be catalysts for the oxidation reaction, and thus oxidation is greatly favored over esterification at temperatures even as low as 0° C. Bertoni (Gazzetta, 20, 372-6; Brit. Chem. Abs., 60 I, 163-4 (1891)) describes a method for the production of secondary butyl nitrate which consists in adding secondary butyl alcohol, dropwise, to a mixture of 2 parts of sulfuric acid and 1 part of nitric acid maintained at a temperature below 0° C. Attempts to prepare secondary butyl nitrate and isopropyl nitrate by this method, in which temperatures only a few degrees below 0° C. were used, showed, however, that a yield of only about 16% of ester, based on the quantity of alcohol used, could be obtained; and attempts to prepare several of the higher secondary nitrates by this method resulted in complete failure.

It has now been found that yields of nitrate as high as 80 to 90% and higher may be obtained by reacting a secondary aliphatic alcohol with a mixture of nitric and sulfuric acids, when the reaction is conducted at a temperature at least as low as —10° C. and when the relative amounts of alcohol, nitric acid, sulfuric acid and water in the reaction mixture are carefully controlled. When the acids employed in the nitration consist only of nitric and sulfuric acids, the amount of nitric acid used should be equal to at least 100% more than the theoretical amount required to nitrate the alcohol present. It it preferred to use an excess of nitric acid ranging between 100% and 250%, although greater excesses may be employed. When other agents are present which tend to prevent crystallization of sulfuric acid, such as acids or phosphorus or water-soluble fatty acids, particularly phosphoric and acetic acids, and which are added in small quantities, generally less than about 20% of the quantity of the sulfuric acid present, an excess of only 50% of nitric acid is often sufficient to give high yields. The sulfuric acid should be present in such a proportion that the molecular ratio of water to the sulfuric acid in the reaction vessel is not greater than about 1.8 when the excess of nitric acid used is about 100%; but this maximum ratio may be increased by 0.1 for each additional 25% excess of nitric acid. The maximum ratio of water to sulfuric acid may thus be given by the expression $1.8+0.004(E-100)$, where E is the percentage excess of nitric acid used. On the other hand, when less than 100% excess, but not less than 50% excess, is used, as when phosphoric acid is present, the maximum ratio of water to sulfuric acid may be decreased by 0.1 for each 25% excess of nitric acid less than 100%. The more general mathematical expression for the ratio to include this case would then be $1.6+0.004(E-50)$, where E is the percentage excess of nitric acid used. Yields have been found to fall off greatly when the ratio of water to sulfuric acid is substantially higher than the amounts given. While the limiting conditions described herein apply to the conditions at the end of the reaction, these limits are preferably not exceeded to any great extent throughout the course of the reaction.

It has been found desirable, although not absolutely necessary from a consideration of yields, to fix a lower limit to the ratio of water to sulfuric acid in the reaction mixture, since, at the low temperatures employed, crystals of sulfuric acid or its hydrates are readily precipitated if sufficient water or other diluent is not present. As a matter of practice, it has in general been found desirable not to have in the reaction mixture at any time a ratio of water to sulfuric acid lower than about 1, although this limit is somewhat variable depending on the amount of nitric acid present, the exact temperature of the reaction, etc. The presence of too great a quantity of solid precipitate interferes with proper agitation and therefore prevents good contact between the reacting compounds. Good agitation is also quite necessary to prevent local overheating when the alcohol first comes into contact with the acids, which would cause oxidation and other side reactions. This local overheating may be further controlled by adding the alcohol slowly and in fine streams or droplets into the acid mixture.

Since the yields of ester increase with a decreasing ratio of water to sulfuric acid, it is desirable to use as low a ratio as possible without causing precipitation of sulfuric acid. It has been found that precipitation may be avoided to a considerable extent, without increasing the proportion of water, by various means. It may be prevented at water-sulfuric acid ratios as low as 1.25 and yields as high as 80 to 84% or higher may be obtained by replacing from 5 to 13% of the sulfuric acid with phosphoric acid and using an excess of nitric acid even as low as 50%. Proportions of phosphoric acid greater than 13% of the total phosphoric and sulfuric acid are not desirable, as yields are lowered considerably.

Precipitation of sulfuric acid during the reaction may be considerably lessened without increasing the ratio of water to sulfuric acid at the end of the reaction, by adding a portion of the acid during the course of the reaction. This, of course, necessitates efficient cooling of the reaction vessel, since much heat will be evolved during the addition of the sulfuric acid. It has been found, however, that advantageous results may be obtained by adding up to one-fourth of the sulfuric acid simultaneously with the whole or a large portion of the alcohol. With a 100% excess of nitric acid, for example, sufficient sulfuric acid may be used to produce at the end of the reaction a water-sulfuric acid ratio as low as 1.5 without causing precipitation, if about one-fourth of the total amount of sulfuric acid is added simultaneously with the first 60% of the alcohol.

Precipitation of sulfuric acid or its hydrate may be avoided by increasing the water-sulfuric acid ratio and without decrease of yields when a very large excess of nitric acid is used. For example, with the use of a 150% excess of nitric acid and a water-sulfuric acid ratio at the end of the reaction of 1.6, a yield as high as 90% may be obtained and without precipitation.

In the recovery of the ester after the reaction is completed, conditions must be carefully controlled in order to prevent loss by decomposition. Secondary amyl nitrate, for example, is unstable toward the concentrated acid mixture at temperatures higher than about −10° C. At this temperature, however, the mixture resulting from the reaction with secondary amyl alcohol is quite viscous, but it has been found that by diluting the mixture with water until the ratio of sulfuric acid to water is about 3 to 2 by weight, the viscosity is reduced and the ester will be less liable to decomposition by the acid, and the oil layer can then be separated practically quantitatively from the acids at temperatures as high as +5° C. or somewhat higher. If under the conditions of the reaction any unreacted alcohol should remain dissolved in the ester, it may conveniently be removed by washing with 85% phosphoric acid in which the nitrates are insoluble.

The methods of the present invention may be illustrated by the following examples:

*Example 1*

The proportions of reactants used were such that there was an excess of 150% of nitric acid and the molecular proportion of water to sulfuric acid at the end of the reaction was 1.6. Into a reaction vessel equipped with stirrer, thermometer and an inlet tube at the bottom containing a porous glass plate, was placed 67.5 parts by weight (0.75 molecular proportion) of 70% nitric acid. 112 parts by weight (1.09 molecular proportions) of 95.0% sulfuric acid were then added slowly while maintaining good agitation and externally cooling with running water to maintain the temperature below 40° C. The mixed acids were then cooled to −12° C. by means of a dry ice bath and maintained at this temperature while 26.4 parts by weight (0.3 molecular proportion) of pure secondary amyl alcohol were added through the glass plate at the bottom, which served to disperse the alcohol into fine droplets, accompanied by slow bubbling with air. The alcohol was added over a period of one hour and the mixture was agitated an additional 25 minutes. 88 parts by weight of distilled water were then added slowly while maintaining the temperature at −10° C. The two layers were separated by gravity. The oil layer was washed with an aqueous 5% solution of sodium carbonate and then with water, all at room temperature. The product was then dried with anhydrous calcium chloride and then distilled. There were obtained 36 parts by weight of secondary amyl nitrate distilling between 120° and 142° C. at atmospheric pressure with slight decomposition, the bulk of the ester distilling at 140° C., the yield being 90% based on the amount of secondary amyl alcohol employed. Distillation of the secondary amyl nitrate at 100 mm. pressure may be accomplished at the constant temperature of 76.5° C. (uncorrected) and without decomposition.

*Example 2*

The same general procedure was followed as in Example 1, except that there was used an excess of only 100% of nitric acid and the ratio of water to sulfuric acid at the end of the reaction was 1.5. There were used 54 parts by weight (0.6 molecular proportion) of 70% nitric acid, 103 parts by weight (1 molecular proportion) of 95.0% sulfuric acid and 26.4 parts by weight (0.3 molecular proportion) of secondary amyl alcohol. The alcohol was added during a period of 45 minutes and the resultant mixture was agitated an additional 15 minutes at −12° to −10° C. Some solid hydrate of sulfuric acid was present until approximately 75% of the alcohol had been added. The reaction mixture was poured on to cracked ice and the two layers separated, the oil layer being treated as in Example 1. The yield of secondary amyl nitrate was 35 parts by weight or 88%, based on the alcohol employed.

*Example 3*

The same proportions of nitric acid and alcohol were used as in Example 2, and the same ratio of water to sulfuric acid resulted at the end of the reaction, but in this example a portion of the sulfuric acid was added simultaneously with a portion of the alcohol. The same general procedure was used as before. Into the reaction vessel at the start were placed 54 parts by weight (0.6 molecular proportion) of 70% nitric acid and 76.7 parts by weight (0.75 molecular proportion) of 95.9% sulfuric acid. 25.5 parts by weight (0.25 molecular proportion) of 95.9% sulfuric acid were added simultaneously with the first 60% of the 26.4 parts by weight (0.3 molecular proportion) of secondary amyl alcohol which were ultimately added to the vessel. This portion of the sulfuric acid was added dropwise above the surface of the reaction mixture. The temperature during the addition was −12° C. The total amount of the alcohol was added over a period of 50 minutes and agitation was continued for another 15 minutes. The reaction product was poured onto cracked ice, and the oil layer was separated and purified as in Example 1. The yield was 35.1 parts by weight of secondary amyl nitrate or 88%.

*Example 4*

In this example a 50% excess of nitric acid was used, together with a mixture of sulfuric and phosphoric acids in such proportions that at the end of the reaction the ratio of water to the total sulfuric and phosphoric acids was 1.25. 40.5 parts by weight (0.45 molecular proportion) of 70% nitric acid were put into a reaction vessel and 92.7 parts by weight of 95% sulfuric acid and 10.3 parts by weight of 95% phosphoric acid were added at a temperature below 40° C. To this mixture were added 26.4 parts by weight (0.3 molecular proportion) of secondary amyl alcohol through the porous glass opening at −15° C. The alcohol was added during a period of 40 minutes and the agitation was continued for 20 minutes longer. The reaction product was poured onto crushed ice and purified as in Example 1. The yield of secondary amyl nitrate was 33.5 parts by weight or 84% of the theoretical amount.

The process of the present invention is applicable generally to the nitration of short or long chain aliphatic compounds containing a secondary alcohol group. It may be applied to the nitration of unsubstituted secondary aliphatic monohydric alcohols, also to polyhydric alcohols, as well as to monohydric and polyhydric alcohols which have various elements or groups substituted on carbon atoms other than the carbon atom of the secondary alcohol group. Examples of secondary alcohols suitable for nitration by the present method, other than those mentioned heretofore, are: isopropyl alcohol, 2-hydroxyhexane, 2,3-dihydroxybutane, 2,3-dihydroxypentane, 2-methyl-2-nitro-1,3-dihydroxybutane, 3-nitro-2-hydroxybutane and 3-chloro-2-hydroxybutane, also longer chain alcohols such as the secondary alcohols prepared by hydrolysis of olefins containing up to 12 or 14 carbon atoms, obtained in the cracking of paraffin wax, also 1,12-dihydroxyoctadecane and secondary alcohols of even higher molecular weight.

The present invention is not to be considered as limited by the various embodiments particularly described in this specification, nor by its use in the nitration of the compounds specifically enumerated, but solely by the terms of the appended claims.

I claim:

1. The method of preparing a secondary alkyl nitrate which comprises reacting a secondary aliphatic alcohol with a mixture of nitric and sulfuric acids at a temperature not higher than −10° C., said nitric acid being present in a molecular excess of at least 100%, and the said sulfuric acid being present in such an amount that the molecular ratio of water to sulfuric acid in the reaction vessel does not exceed $1.8+0.004\ (E-100)$, where E is the percentage excess of nitric acid used.

2. The method of preparing a secondary alkyl nitrate which comprises reacting a secondary aliphatic alcohol with a mixture of nitric and sulfuric acids, which contains in addition a small quantity of an acid selected from the group consisting of acids of phosphorus and water-soluble fatty acids, the said nitric acid being present in a molecular excess of at least 50%, and the said sulfuric acid being present in such an amount that the molecular ratio of water to sulfuric acid in the reaction vessel does not exceed $1.6+0.004\ (E-50)$, where E is the percentage excess of nitric acid used.

3. The method of preparing a secondary alkyl nitrate which comprises reacting a secondary aliphatic alcohol with a mixture of nitric, sulfuric and phosphoric acids at a temperature not higher than −10° C., said nitric acid being present in a molecular excess of at least 50%, the said sulfuric acid being present in such an amount that the molecular ratio of water to sulfuric acid in the reaction vessel does not exceed $1.6+0.004\ (E-50)$, where E is the percentage excess of nitric acid used, and the said phosphoric acid being present in an amount equal to 5 to 13% by weight of the combined sulfuric and phosphoric acids.

4. The method according to claim 1, in which the said nitric acid is present in a molecular excess of at least 150%.

5. The method according to claim 1, in which a substantial proportion, but not more than about one-fourth, of the said sulfuric acid is added to the reaction mixture during the nitration process.

6. The method of preparing secondary amyl nitrate which comprises adding secondary amyl alcohol to a mixture of nitric and sulfuric acids at a temperature not higher than −10° C., the said nitric acid being present in a molecular excess of at least 100%, and the said sulfuric acid being present in such an amount that the ratio of water to sulfuric acid in the reaction vessel does not exceed $1.8+0.004\ (E-100)$, where E is the percentage excess of nitric acid used.

7. The method of preparing secondary amyl nitrate which comprises adding secondary amyl alcohol to a mixture of nitric, sulfuric and phosphoric acids at a temperature not higher than −10° C., the said nitric acid being present in molecular excess of at least 50%, the said sulfuric acid being present in such an amount that the molecular ratio of water to sulfuric acid in the reaction vessel does not exceed $1.6+0.004\ (E-50)$, where E is the percentage excess of nitric acid used, and the said phosphoric acid being present in an amount equal to 5 to 13% by weight of the combined sulfuric and phosphoric acids.

8. The method of preparing secondary amyl nitrate which comprises adding secondary amyl alcohol to about 100% excess of nitric acid in the presence of an amount of sulfuric acid sufficient to produce at the end of the reaction a molecular ratio of water to sulfuric acid of about 1.5, the reaction being conducted at a temperature not higher than −10° C.

9. The method of preparing secondary amyl nitrate which comprises adding secondary amyl alcohol to about 150% excess of nitric acid in the presence of an amount of sulfuric acid sufficient to produce at the end of the reaction a molecular ratio of water to sulfuric acid of about 1.6, the reaction being conducted at a temperature not higher than −10° C.

10. The method of preparing secondary amyl nitrate which comprises adding secondary amyl alcohol to about 100% molecular excess of nitric acid in the presence of an amount of sulfuric acid sufficient to produce at the end of the reaction a molecular ratio of water to sulfuric acid of about 1.5, about one-fourth of said sulfuric acid being added to the acid mixture simultaneously with the addition of the first 60% of the alcohol to be used, the reaction being conducted at a temperature not higher than −10° C.

11. The method of preparing secondary amyl nitrate which comprises adding secondary amyl alcohol to about 50% excess of nitric acid in the presence of a mixture of sulfuric and phosphoric acids at a temperature not higher than −10° C., the amount of said sulfuric and phosphoric acids being sufficient to produce at the end of the reaction a molecular ratio of water to the combined sulfuric and phosphoric acids equal to about 1.25, and the said phosphoric acid being present in an amount equal to about 10% of the weight of the combined sulfuric and phosphoric acids.

BYRON M. VANDERBILT.